April 9, 1940.                W. B. SCACE ET AL                 2,196,876
                               DISPLAY DEVICE
                            Filed Nov. 3, 1938                2 Sheets-Sheet 1

INVENTORS
William B. Scace
Steven E. Scace
BY
ATTORNEY.

April 9, 1940.  W. B. SCACE ET AL  2,196,876
DISPLAY DEVICE
Filed Nov. 3, 1938   2 Sheets-Sheet 2
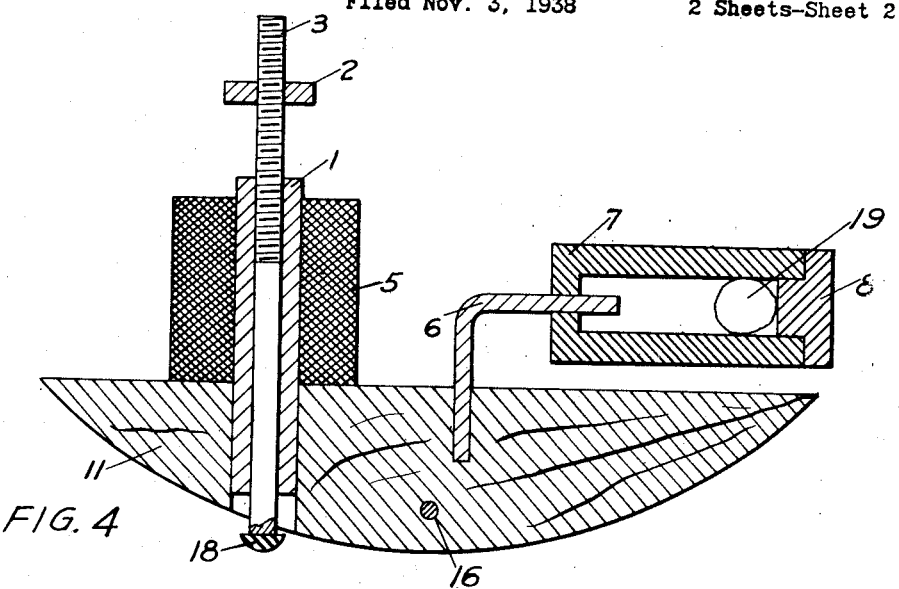
FIG. 4
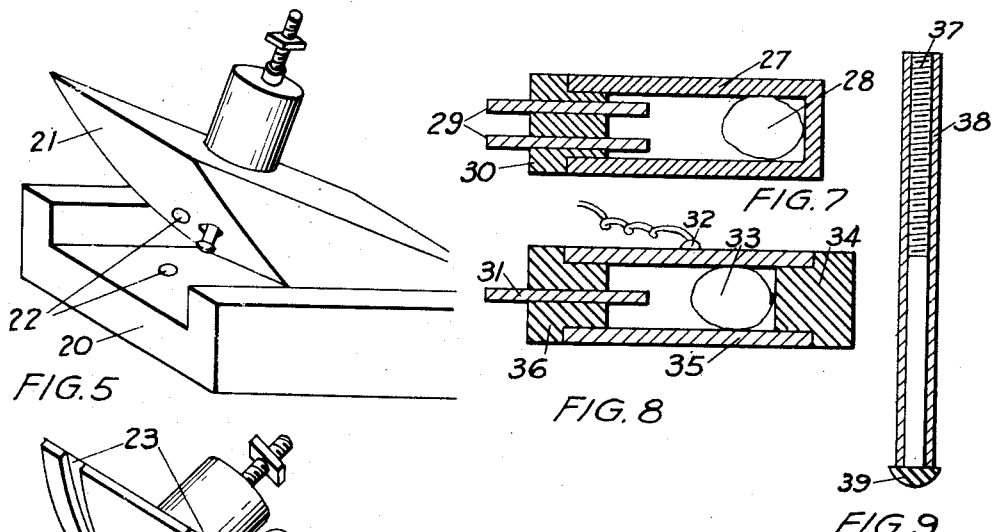
FIG. 5      FIG. 7
            FIG. 8
            FIG. 9
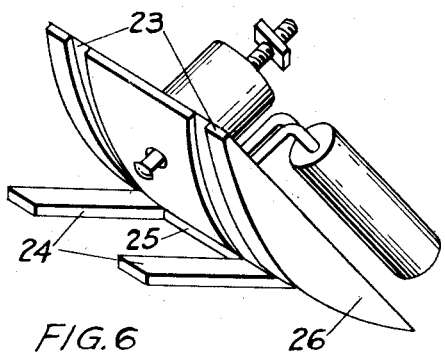
FIG. 6
INVENTORS
William B. Scace
Stan E. Scace
BY
ATTORNEY.

Patented Apr. 9, 1940

2,196,876

UNITED STATES PATENT OFFICE 2,196,876

DISPLAY DEVICE

William B. Scace and Steven E. Scace, Chicago, Ill.

Application November 3, 1938, Serial No. 238,544

13 Claims. (Cl. 40—139)

This invention relates to display devices and, more particularly, to such devices wherein the entire device, or a movable portion thereof, is caused to move by electro-magnetic means. The invention has for its aims and objects the following:

1. To provide an inexpensive construction of elements for display devices having movable display elements whereby the motion of such elements is rendered more even, dependable, and adjustable than heretofore.

2. To provide a motion display device which may be readily adapted to a variety of different display members and upon which display members may be easily and quickly changed.

3. To provide a novel and attractive display device which is economical to operate as well as inexpensive to construct.

4. To provide a switch which is dependable in operation, not easily broken, and which acts as a fuse, automatically breaking the electrical circuit of which it is a part when said electric circuit becomes over-loaded or short-circuited.

A study of the prior art discloses the use, in similar devices, of a pendulum, or of a display member mounted upon a spring or springs, either of which is actuated by means of a coil intermittently energized by an electric circuit which includes a switch to make and break said circuit at intervals.

By mounting a movable display element upon an arcuate base which is caused to rock back and forth by means of an intermittently energized coil and a plunger, we find the motion imparted to such display element is even and regular, and its amplitude may be easily regulated.

In the past, most display devices of this type, when used on 110–120 volt house current, have used either a mercury-type switch or a contact point-type switch to make and break the electric circuit which energizes the coil of said device. We have found that the contact point-type switch, when used on 110–120 volt current, arcs excessively, burns easily, and has a short life. The mercury switch of prior art, while operating satisfactorily, has been found to be costly to make and renders the cost of the display device upon which it is installed excessive, thus restricting the use of said device.

Our mercury switch is less expensive to make than the mercury switch of prior art and possesses several advantages over said prior art switch. Instead of using a glass envelope to contain the electrodes and mercury as taught by prior art, we use a container of thermal plastic material having a high dielectric characteristic and being virtually impervious to mercury. A great many display devices in the past, particularly inexpensive ones, have overheated, their coils have become short-circuited, and fires have resulted. In meeting this problem, we have constructed our switch with one or more plugs tightly fitted into openings of the mercury container. In the event of a short circuit in the electric circuit of which the switch is a part, these plugs are forced out of place, the mercury expelled from the container and the electric circuit is automatically broken. The switch, thus, acts as a fuse as well as a switch or circuit breaker.

We have conducted a number of tests with thermal plastic substances and have found most of them to be suitable for use in our switch. The thermal plastic most adapted to this use is a phenol formaldehyde cast synthetic resin—thermal setting. In order that those skilled in the art may construct our switch without being forced to resort to experimentation, the trade name of this plastic is "Catalin." Plastics having the trade names of "Tenite" and "Bakelite" are also suitable.

We are not now able to say whether or not all thermal plastics are suitable for use in our switch, but we do not wish to be limited in the scope of our invention to those plastics which we have tested, several of which we have named. We therefore wish to include within the scope of our invention, any thermal plastic having the dielectric and mercury-resistant qualities necessary in the construction of a mercury-type switch. In addition to acting as a switch and circuit breaker, our switch acts as a fuse. It is also considerably less frangible than the switch of prior art.

The aforementioned and other objects and features of novelty will be in part obvious, and in part pointed out more in detail hereinafter.

The invention consists, accordingly, in the features of construction, combination of elements, and arrangements of parts which will be exemplified in the construction hereinafter set forth and the scope of the application of which will be indicated in the appended claims.

In the accompanying drawings wherein similar characters designate corresponding parts:

Figure 4 is a section view on the line 4—4, Figure 1;

Figure 5 is an isometric view of the base and stand showing a contact-type switch (without wiring);

Figure 6 is an isometric view of the base as used with a track (without wiring);

Figure 7 is a metallic container switch with one plug and two electrodes according to the invention;

Figure 8 is a switch according to the invention; and

Figure 9 is a plunger according to the invention.

Figure 1:
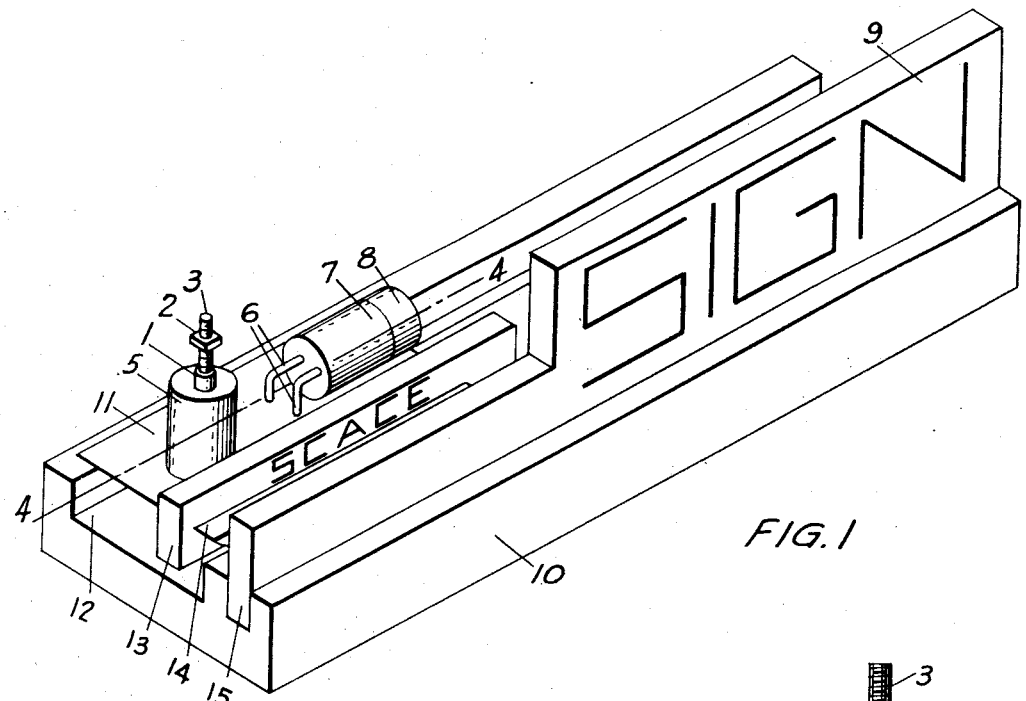
Figure 1 is a display device according to the invention in an isometric view (electric wiring omitted) showing plastic switch.
Figure 2:
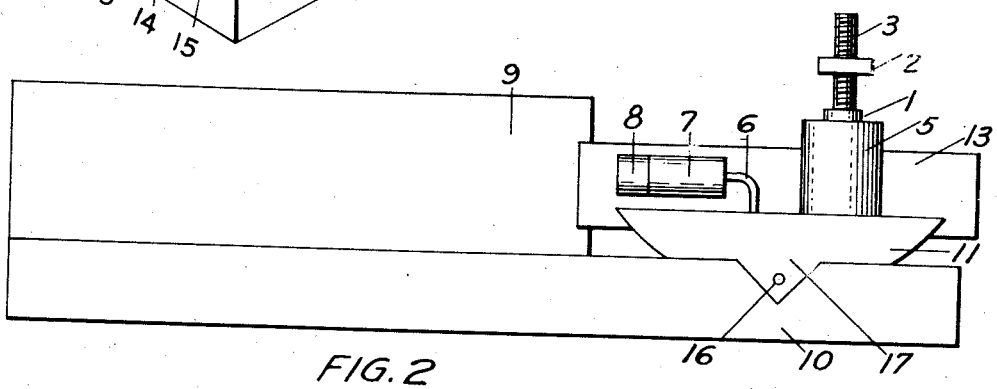
Figure 2 is a rear elevation of Figure 1.
Figure 3:
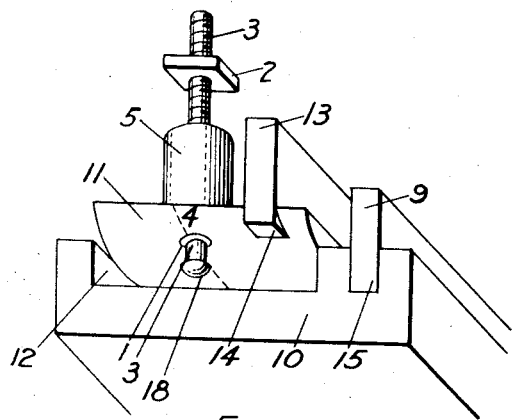
Figure 3 is an isometric view of end in Figure 1.
Figure 3A:
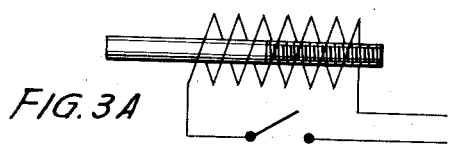
Figure 3a is a wiring diagram with the switch open.
Figure 3B:
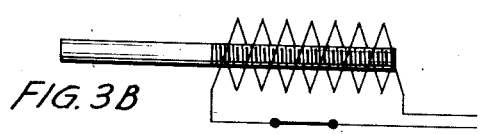
Figure 3b is a wiring diagram with the switch closed.

Referring now to the drawings. A fixed display member 9, Figures 1, 2, and 3, is attached to a support 10 by engagement with slot 15 in said support. A movable display member 13 is mounted on an arcuate base 11 by engagement in slot 14 on said arcuate base which rests in a groove 12 in support 10 and is held in position thereon by the engagement of pins 16 on either side of base 11 engaging with notches 17 in support 10 on either side of groove 12. A coil 5, having a core 1 extending through said coil 5 on either side, is mounted on base 11 by the engagement of said core 1 in a hole of the same size in base 11. A plunger 3, having a magnetic and a nonmagnetic segment is slidably fitted to move within core 1, said magnetic segment being uppermost. The plunger 3 extends through the said core 1 and makes contact with the support 10. An adjusting element 2 is threaded upon plunger 3 in order to regulate the movement of the plunger 3 within the core 1. A mercury switch 7 with a plug 8 in one end is secured to the base 11 by means of its electrodes 6 which are forced into base 11. Figures 3a and 3b show how the switch 7 and the coil 5 are in series in an electric circuit. When the circuit is closed by switch 7 (Figure 3b) the magnetic (shaded) segment of plunger 3 is drawn almost completely through the coil 5.

When the electric circuit is closed by the action of the mercury switch 7, the plunger 7 is sucked through the coil 5 and because the end of said plunger 3 is in contact with the support 10, the coil is forced to move upward along the plunger 3. This imparts a thrust to the base 11 which rocks to the extreme limit of its motion away from the side on which coil 5 is mounted. This movement of the base 11 causes the mercury 19 to flow to the end of switch 7 opposite the end containing the electrodes 6 and the circuit of electrical current is broken. When the said electric circuit is broken, the coil 5 no longer exerts a pull on plunger 3 and the force of gravity causes the base 11 to rock to the other limit of its motion, that is, toward the end containing the coil 5. The mercury 19 then flows toward the electrode end of the switch 7, the coil 5 is again energized, and the base begins its rocking motion again.

The switch is so positioned on base 11 that when said base is in a position of rest as shown in Figure 2, the mercury 19 in said switch 7 is at the electrode end of said switch and the electric circuit is closed, thus energizing the coil 5 and permitting the base 11 to begin its motion without the aid of an initial external thrust being imparted to it. The adjusting member or element 2 may be moved along the plunger 3, toward or away from the coil 5 and thus regulate the amplitude of motion of said plunger 3 within said coil 5. This, in turn, regulates the motion of the base 11. The magnetic segment of plunger 3 is positioned within coil 5 so that said coil 5 exerts a maximum of pull initially when the rocker motion of base 11 is begun.

When the movable display member is used without a fixed display member, the base 21 is mounted on a stand 20 as shown in Figure 5. Instead of a mercury switch we sometimes use contact points in an electrical circuit, Figure 5, one contact point 22 being on the base 21 and one contact point 22 being on the stand 20. The circuit remains open until the movement of base 21 brings the two contact points 22 together, when the said circuit is closed.

The base 26, Figure 6, may be used to run on a track having electrical conductors 24 which engage electrical conductors 23 mounted on said base 26. The base 26 is kept in its position on track conductors 24 by means of a guide 25 mounted on base 26. An electrical current is introduced to the conductors 24 and the circuit is completed through the conductors 23, the coil and the switch mounted on said base 26.

We have found that by constructing mercury switches from thermal plastic material and then introducing electrodes into the mercury container at one end and a plug into an opening in the said container at the other end as shown in Figure 4, we have a very sturdy switch which also acts as a fuse, inasmuch as when a short circuit occurs, the internal pressure in the container forces the plug from its seat and the mercury is expelled, thus opening the circuit. Figure 7 shows the use of a pure iron container using two electrodes introduced through a thermal plastic plug. Figure 8 shows a pure iron container with only one electrode, the container itself being the other electrode.

What is claimed is:

1. A display device comprising, in combination, an arcuate base; a movable display member affixed to said base; a coil supported upon said base; a plunger slidably fitted to move within the core of said coil and adapted to extend through the aforesaid base; an electric circuit connected to said coil; and a switch located in said electric circuit whereby said coil may be energized at intervals.

2. A display device comprising, in combination, a fixed display member mounted upon a support; an arcuate base adapted to rock back and forth upon said support; a movable display element member affixed to said arcuate base; a coil supported upon said arcuate base; a plunger adapted to move within said coil and extending through the aforesaid base so that when the said coil is energized the said plunger exerts a force against the aforesaid support upon which the said base rests, thereby causing said base to rock in one direction and when the said coil is not energized, the force of gravity causes the said base to return to its normal position; an electric circuit which includes the aforesaid coil; a switch located in said electric circuit, alternately opening and closing said electric circuit, thereby intermittently energizing said coil; and means to keep said arcuate base in its position relative to the aforesaid fixed display member.

3. A display device comprising, in combination, a movable display member mounted upon an arcuate base, said base being adapted to rock back and forth; a stand upon which said base is mounted and upon which said base is free to rock; a coil mounted upon said arcuate base; a plunger fitted to move within said coil and extending through said base to engage the said stand so that when the said coil is energized, the said plunger is caused to engage the said stand and the said coil is caused to move along said plunger causing the aforesaid base to rock back and forth; an electric circuit which includes said coil; a switch in said circuit, said switch being mounted upon said base and adjusted thereon so that motion of the said base causes the switch to open and close the said circuit; and means to secure the said base to the aforesaid stand.

4. A display device comprising, in combination, a movable display member; an arcuate base upon which said display member is mounted; a coil mounted upon said arcuate base; a plunger adapted to move within said coil and extending through said coil and said base; a track upon which said base is free to move; electrical conductors affixed to said track and to said base; a switch mounted upon said base; an electric circuit which includes the said coil, the said switch, and the said conductors; and means whereby the said base is kept upon the said track.

5. A display device comprising, in combination, a movable display member; an arcuate base upon which said display member is mounted; and electro-magnetic means to cause said base to rock back and forth.

6. In a display device of the type described having, in combination, an arcuate base supported on a stand, a switch having a contact point on said arcuate base and a contact point on said stand so located respectively that when said arcuate base is rocked to one limit of its motion, the aforesaid contact points co-act completing an electrical circuit and when the aforesaid base is rocked to the other limit of its motion, the said contact points separate, thus breaking the aforesaid electric circuit.

7. In a display device of the type described, the combination of an arcuate base; a coil mounted upon said arcuate base; a plunger positioned to move within said coil and extending through said coil and said base; and means for intermittently energizing said coil.

8. A display device comprising, in combination, a support; an arcuate member positioned upon said support and adapted to rock thereon; a coil mounted upon said arcuate member; a plunger positioned within said coil and extending through the aforesaid arcuate member and engaging the aforesaid support; and means mounted upon said arcuate member to intermittently energize said coil.

9. In a display device, the combination of an arcuate base; a coil positioned on said base; a plunger positioned within said coil and extending through said coil and said base, said plunger being composed of a segment of non-magnetic material and a segment of magnetic material; and means for intermittently energizing said coil.

10. A display device comprising, in combination, an arcuate base; a support for said arcuate base; and electro-magnetic means for causing said base to rock upon said support.

11. A display device comprising, in combination, an arcuate base; a coil mounted upon said arcuate base; a plunger positioned within said coil and extending through said coil and through the aforesaid arcuate base; means for intermittently energizing said coil; and means for controlling the motion of said coil and said plunger, said means consisting of an element slidably fitted upon said plunger.

12. In a display device of the type described, wherein a coil is intermittently energized, the combination with said display device of a switch having an insulated tubular container, mercury contained within said container, electrodes projecting through the wall of said container, and a plug fitted within an opening in the wall of said container.

13. In combination with a display device wherein an electrical circuit is intermittently made and broken, a mercury switch comprising a container, mercury enclosed within said container, electrodes extending through the wall of said container, and a plug fitted within an opening in the wall of said container.

WILLIAM B. SCACE.
STEVEN E. SCACE.